(12) United States Patent
Rotte et al.

(10) Patent No.: US 10,419,697 B2
(45) Date of Patent: Sep. 17, 2019

(54) SYSTEM AND METHOD FOR HIGH DYNAMIC RANGE DIGITAL DOUBLE SAMPLING

(71) Applicant: GVBB HOLDINGS S.A.R.L., Luxembourg (LU)

(72) Inventors: Jeroen Rotte, Breda (NL); Rik Visser, Everdingen (NL); Juul Josephus Johannes Van Den Heijkant, Breda (NL)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

(21) Appl. No.: 15/693,034

(22) Filed: Aug. 31, 2017

(65) Prior Publication Data
US 2018/0070032 A1 Mar. 8, 2018

Related U.S. Application Data

(60) Provisional application No. 62/384,970, filed on Sep. 8, 2016.

(51) Int. Cl.
*H04N 5/359* (2011.01)
*H04N 5/363* (2011.01)
(Continued)

(52) U.S. Cl.
CPC ........... *H04N 5/359* (2013.01); *H04N 5/3598* (2013.01); *H04N 5/363* (2013.01); *H04N 5/374* (2013.01); *H04N 5/378* (2013.01); *H04N 5/361* (2013.01)

(58) Field of Classification Search
CPC ...... H04N 5/359; H04N 5/3598; H04N 5/363; H04N 5/374; H04N 5/378
See application file for complete search history.

(56) References Cited

U.S. PATENT DOCUMENTS

2006/0176519 A1* 8/2006 Ouchi .................... H04N 1/409
358/443
2007/0188641 A1* 8/2007 Jang ..................... H04N 5/3598
348/308

(Continued)

FOREIGN PATENT DOCUMENTS

JP 2000287131 A 10/2000

OTHER PUBLICATIONS

International Search Report & Written Opinion issued in PCT/EP2017/072196 dated Nov. 7, 2017.

*Primary Examiner* — Nicholas G Giles
(74) *Attorney, Agent, or Firm* — Arent Fox LLP

(57) ABSTRACT

A system and method is provided for performing high dynamic range digital double sampling. More particularly, a CMOS image sensor is provided that includes a pixel array with each pixel sampling both dark and bright values for digital double sampling. After the sampled signals are digitized, a mean dark value is determined and each dark value is further fed to a lookup table that generates an output value taking into account whether the pixel has been saturated. In over exposed conditions, the lookup table will generate a negative value output to eliminate image artifacts. All three values are fed to adder logic circuit that subtracts the mean dark value and the lookup table output from the bright value. This resulting output is fed to a video viewer.

24 Claims, 13 Drawing Sheets

(51) Int. Cl.
*H04N 5/374* (2011.01)
*H04N 5/378* (2011.01)
*H04N 5/361* (2011.01)

(56) References Cited

U.S. PATENT DOCUMENTS

| | | | | |
|---|---|---|---|---|
| 2009/0207290 A1* | 8/2009 | Kondo | ............... | H04N 5/3575 348/302 |
| 2009/0224140 A1* | 9/2009 | Gomi | ............... | H04N 5/3575 250/214 A |
| 2009/0284634 A1* | 11/2009 | Tsukimura | ............... | H04N 5/3598 348/308 |
| 2014/0270572 A1* | 9/2014 | Yin | ............... | G06T 3/00 382/278 |
| 2016/0255291 A1* | 9/2016 | Isobe | ............... | H04N 5/3598 348/251 |

* cited by examiner

SYSTEM AND METHOD FOR HIGH DYNAMIC RANGE DIGITAL DOUBLE SAMPLING

CROSS REFERENCE TO RELATED APPLICATIONS

The current application claims priority to U.S. Patent Provisional Application No. 62/384,970, filed Sep. 8, 2016, the entire contents of which are hereby incorporated by reference.

TECHNICAL FIELD

The disclosure herein generally relates to CMOS images sensors, and, more particularly, to a method for performing high dynamic range digital double sampling and a CMOS image sensor for performing the same.

BACKGROUND

Complementary metal oxide semiconductor ("CMOS") image sensors are widely used in digital cameras to produce digital images by converting optical signals into electrical signals. In operation, CMOS image sensors convert an optical signal into an electrical signal using a multitude of pixels that each include a photodiode and a read-out circuit. The photodiode generates electric charges using absorbed light, converts the generated electric charges into an analog current, and delivers the analog current to the read-out circuit. The read-out circuit converts the analog signal into a digital signal and outputs the digital signal.

FIG. 1 illustrates one exemplary design of pixel for a CMOS image sensor that includes four transistors (i.e., a "4T pixel") that is connected to a bitline. As shown, the CMOS image sensor pixel 10 includes a photodiode ("PD") that provides the photon to electron conversion, while a floating diffusion ("FD") point provides the electron to voltage conversion. The voltage per electron conversion of the FD is known as conversion gain ("CG") and is an important parameter for CMOS image sensors. Conversion gain boosts the pixel signal relative to the analog noise, thereby reducing the noise floor, and thereby enabling performance at lower light levels.

For CMOS image sensors, including the 4T pixel design shown in FIG. 1, digital double sampling ("DDS") is used to remove undesired offsets of measured pixel voltage output. DDS means obtaining a difference ($D_{sig}-D_{rst}$) between digital data $D_{rst}$ obtained by converting a first analog signal output by an initialized pixel into digital data, and digital data $D_{sig}$ obtained by converting a second analog signal received from the pixel that has received an external image signal into digital data, wherein the second analog signal corresponds to the external image signal. Using the pixel design in FIG. 1 as an example, the pixel is reset when the reset transistor ("RST") and transfer gate ("TG") are turned on simultaneously, setting both the floating diffusion FD and the photodiode PD to the VDD voltage level. Next, the transfer gate TG is turned off (disconnecting the photodiode PD and floating diffusion FD) and the photodiode PD is left to integrate light.

After integration, the signal measurement occurs. First, the reset transistor RST is turned on and off to reset the floating diffusion FD. Immediately after this, the reset level is sampled from the floating diffusion FD and stored on the column circuit, i.e., bitline 20. Next, the transfer gate TG is turned on and off which allows charge on the photodiode PD to transfer to the floating diffusion (FD). Once the charge transfer is complete, this charge (the photodiode signal level plus the floating diffusion reset level) is measured and stored on bitline 20 as well.

These two stored voltages are then differenced ($D_{sig}-D_{rst}$) to determine the photodiode signal level. This design allows for correlated double sampling ("CDS") operation to occur, as the reset level used to determine the absolute pixel level is now measured before the signal level and the same reset level is referenced throughout the measurement. Using DDS, a pixel array using the 4T pixel design 10, for example, significantly improves the performance of such CMOS image sensors, reducing both read noise and image lag. In addition, the design reduces pixel source follow offsets and the like.

One technical issue with existing CMOS image sensors is that they can be prone to producing artifacts in the resulting image. Artifacts are areas in the image that correspond to areas of the sensor that have been exposed to extremely high light levels and can appear black (e.g., "black sun") in the image when in fact they should be the brightest objects in the image.

Artifacts are produced by highly oversaturated pixels in the pixel array. Oversaturated pixels are pixels that are exposed to more light energy than the pixel's photodiode can absorb during exposure time. For example, if a CMOS image sensor is operating with DDS and limiters are not applied, charge can quickly build up after reset so that the sampled dark value fills up. As described above, the difference between the reset voltage (i.e., the dark sample) and the signal voltage (i.e., the bright sample) determines the resulting brightness value of the pixel (i.e., the DDS output). When the dark sample increases significantly due to pixel saturation, the DDS output will drop significantly resulting in black sun artifacts.

FIG. 2A illustrates a graph illustrating the DDS output as a function of the sampled dark and bright pixel voltage outputs. As shown, while the pixel initially operates with full functionality (i.e., no saturation), the DDS output is aligned to the sampled and digitized bright value. However, when the sampled dark value reaches a critical value as the pixel begins to saturate, the DDS output begins to decrease even though the bright value remains constant (e.g., at over 4000 DN). As the dark value increases, the DDS output drops to a point where the resulting output is black even though the measured illumination is very bright. FIG. 2B illustrates a computer image showing black sun artifacts in this case.

Some existing designs have attempted to resolve this issue by adding a limiter on the sample black value. For example, the read out circuit of the pixel array may include logic that provides a DDS output of 2^14-1, for example, if the sampled black value is greater than a certain limit value. However, the resulting image is still not clean as the highlights are washed out and randomized due to raw dark values. FIG. 2C illustrates a computer image showing a resulting image of a CMOS image sensor using limiter circuit to remove black sun artifacts.

Yet another existing design has attempted to use a lookup table fader on the dark signal to remove black sun artifacts. Based on the measured dark value output, a lookup table will define a DDS output and as the dark value increases, the DDS output will also increase in a defined manner. FIG. 2D illustrates an example of the lookup table fader. However, as shown, the highlights still appeared washed out (i.e., the hatched pattern cannot be seen for the portion of saturate pixels) as shown in FIG. 2E. Thus, improvements in such imaging technology to reduce artifacts are still needed.

SUMMARY

As disclosed herein, a system and method is provided for performing high dynamic range digital double sampling according to an exemplary embodiment. As will be described in detail, the system includes a logic circuit with a programmable lookup table that inverts its output when sampled dark levels of saturated pixels reach a defined/programmed threshold. This technique facilitates digital double sampling for an imaging device that suppresses kTC noise and remove all other disturbances and artifacts, including offsets in the readout chain up to the digital conversion. At the same time, the disclosed system an method produces a resulting image that preserves the details in the highlights that are otherwise lost using the conventional designs described above.

Thus, according to an exemplary embodiment, an image processing system is provided for removing black sun artifacts in a captured image resulting from oversaturated pixels of a CMOS image sensor. In this aspect, the image processing system includes a pixel sampler configured to sample a digital dark value, a digital bright value and a digital double bright value of at least one pixel in a pixel array of a CMOS image sensor during image capture, the digital bright value corresponding to a sampled output of a first sub-pixel of the at least one pixel and the digital double bright value corresponding to a sampled combined output of the first sub-pixel and a second sub-pixel of the at least one pixel, a digitized output value calculator configured to calculate a digitized value of the second sub-pixel by subtracting the sampled digital bright value from the sampled digital double bright value, and a digital dark value adjuster configured to subtract a mean dark value of the at least one pixel from the sampled digital dark value to produce an adjusted dark value. Moreover, a lookup table is provided that is configured to receive the adjusted dark value and determine a corresponding illumination output value for the digital dark value, wherein the determined illumination output value is configured to remove black sun artifacts in the captured image when displayed on a display device. In addition, the system includes an image correction signal generator configured to generate a digital double sampling (DDS) output value by subtracting the mean dark value and the determined illumination output value from the sampled digital bright value; a bright value selector configured to determine the calculated digitized value of the second sub-pixel for a corrected image signal for image generation when a relational operator determines that the second sub-pixel is not saturated, and to determine the generated DDS output value as the corrected image signal for the image generation when the relational operator determines that the second sub-pixel is saturated; and an image generator configured to display the captured image on the display device based on the determined corrected image signal, such that the captured image is displayed without black sun artifacts.

In another exemplary embodiment, an image processing system is provided for removing artifacts from a captured image resulting from oversaturated pixels. In this aspect, the image processing system includes a pixel sampler configured to sample a digital dark value and a digital bright value of at least one saturated pixel in a pixel array of an image sensor during image capture; a digital dark value adjuster configured to subtract a mean dark value of the at least one saturated pixel from the sampled digital dark value to produce an adjusted dark value; an artifact corrector configured to determine an artifact correction value by inputting the adjusted dark value into a lookup table that outputs an optimal artifact correction value that is configured to remove at least one artifact from the captured image when displayed on a display device; an image correction signal generator configured to generate a corrected digital bright value for the at least one saturated pixel by subtracting the mean dark value and the identified optimal artifact correction value from the sampled digital bright value; and an image generator configured to display a corrected captured image based on the corrected digital bright value that does not display at least one artifact based on the at least one saturated pixel.

In another exemplary aspect, an image processing system is provided for generating an enhanced image without artifacts caused by oversaturated pixels. In this aspect, the image processing system includes an artifact correction determiner configured to identify at least one artifact correction value based at least on an obtained dark value of at least one pixel of an image sensor; and a pixel output corrector configured to apply the identified at least one artifact correction value to an obtained output value of the at least one pixel to generate an enhanced image configured to be displayed without at least one artifact caused by saturation of the at least one pixel.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
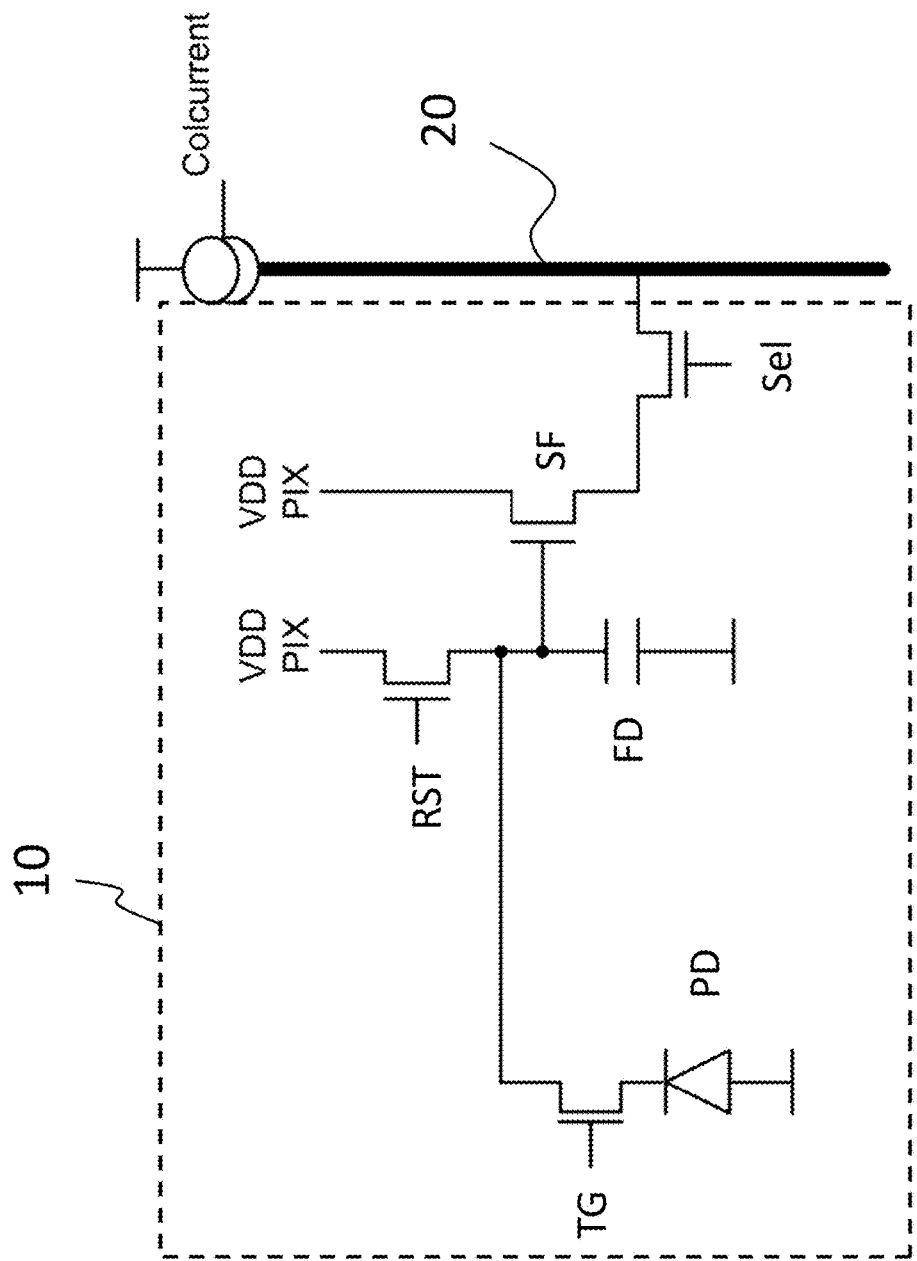
FIG. 1 illustrates a typical design of pixel for a CMOS image sensor that includes four transistors and that is connected to a bitline.
Figure 2A:
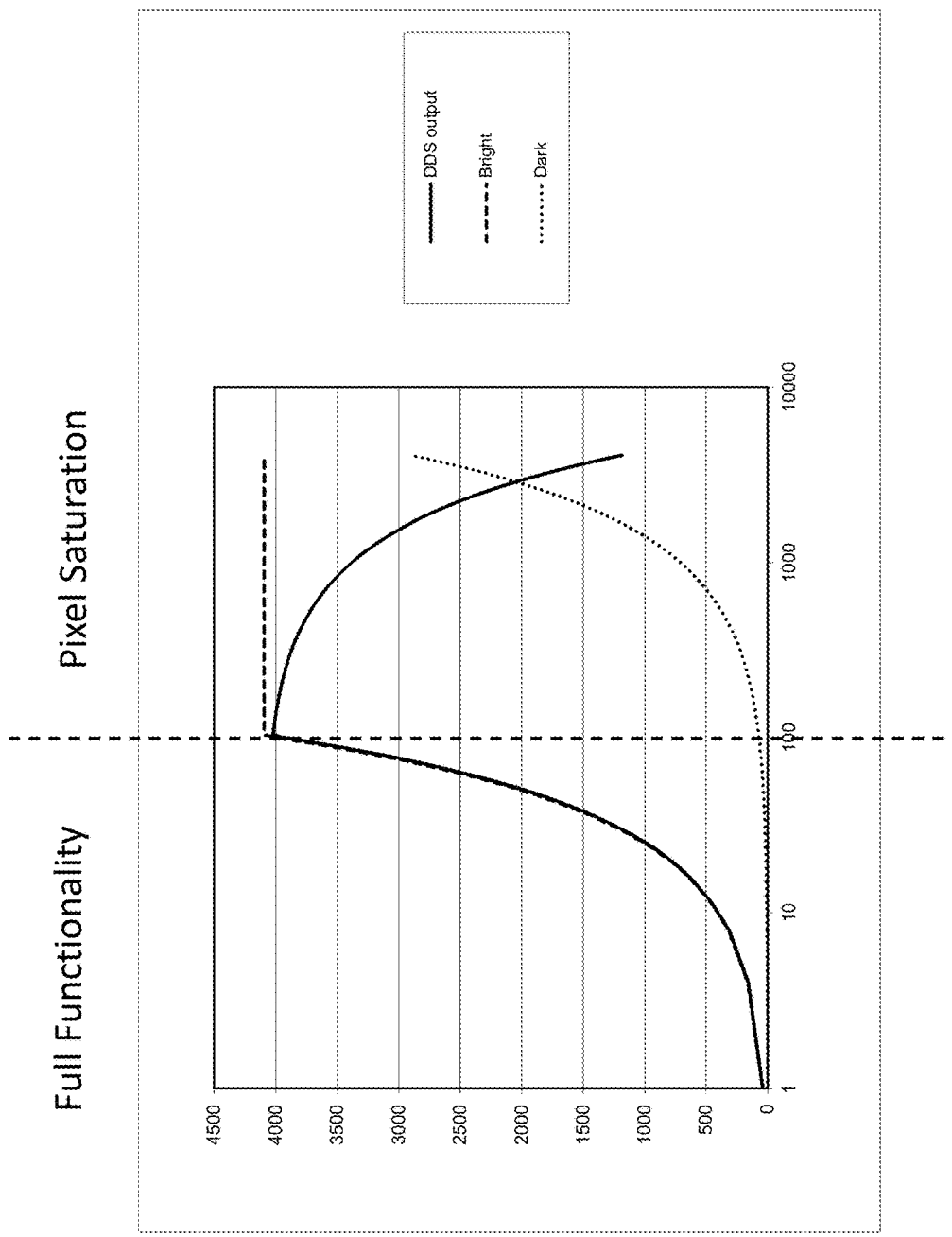
FIG. 2A illustrates a graph illustrating the DDS output as a function of the sampled dark and bright pixel voltage outputs.
Figure 2B:
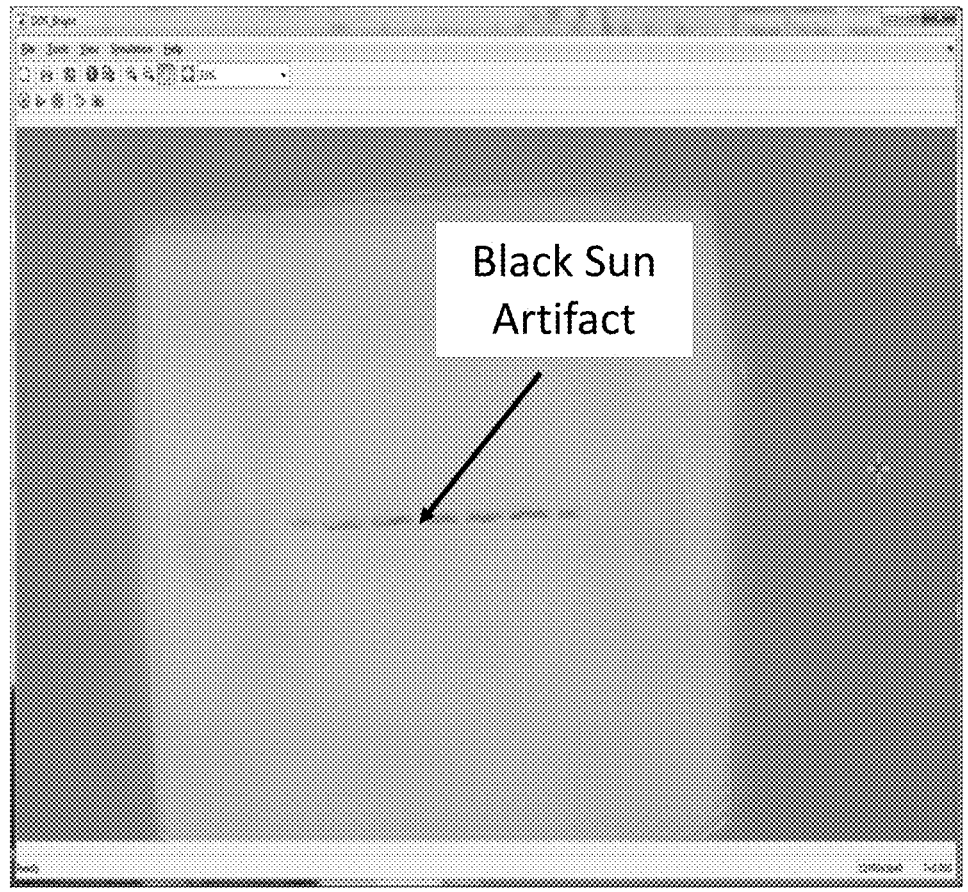
FIG. 2B illustrates a computer image showing black sun artifacts generated by a conventional CMOS image sensor.
Figure 2C:
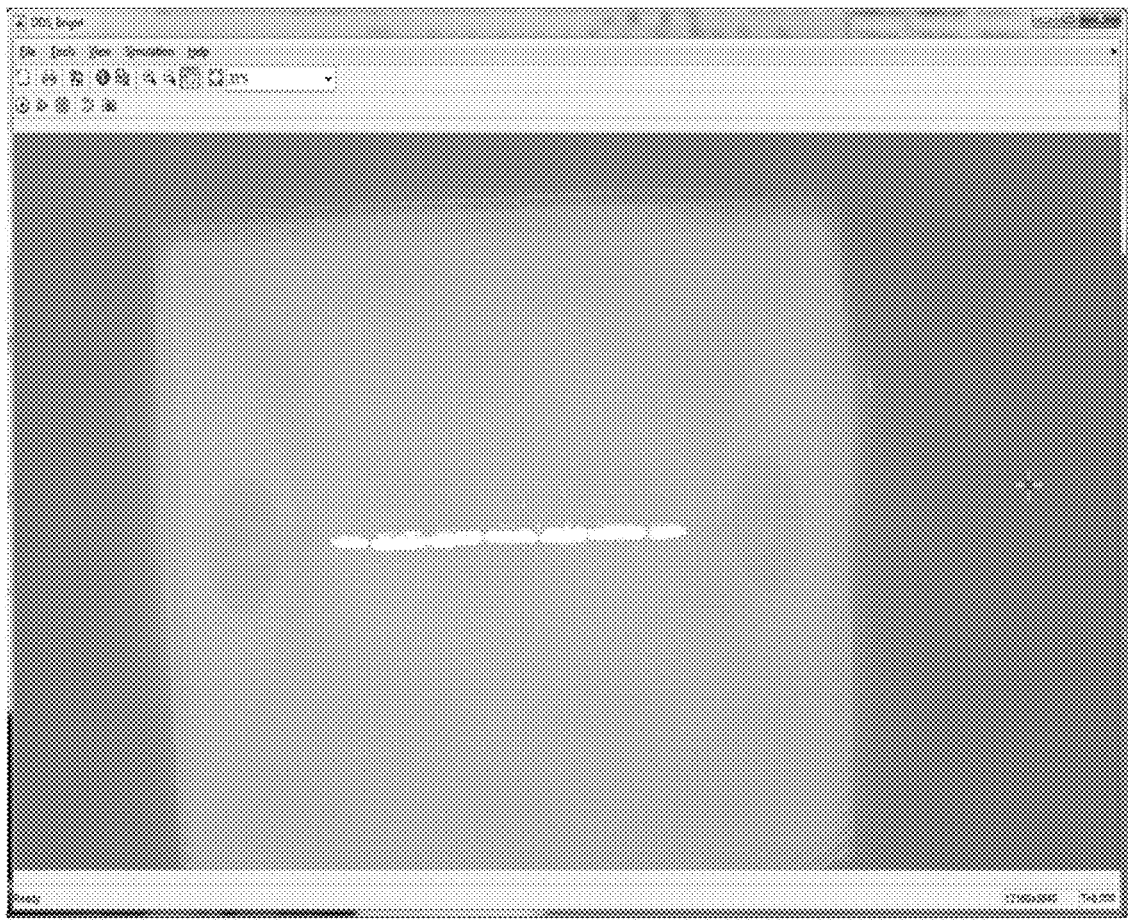
FIG. 2C illustrates a computer image showing a resulting image of a conventional CMOS image sensor using a limiter circuit to remove black sun artifacts.
Figure 2D:
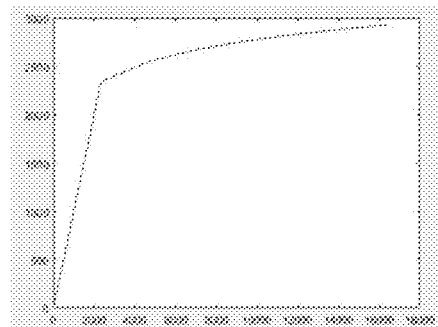
FIG. 2D illustrates an example of the lookup table fader implemented by a conventional CMOS image sensor.
Figure 2E:
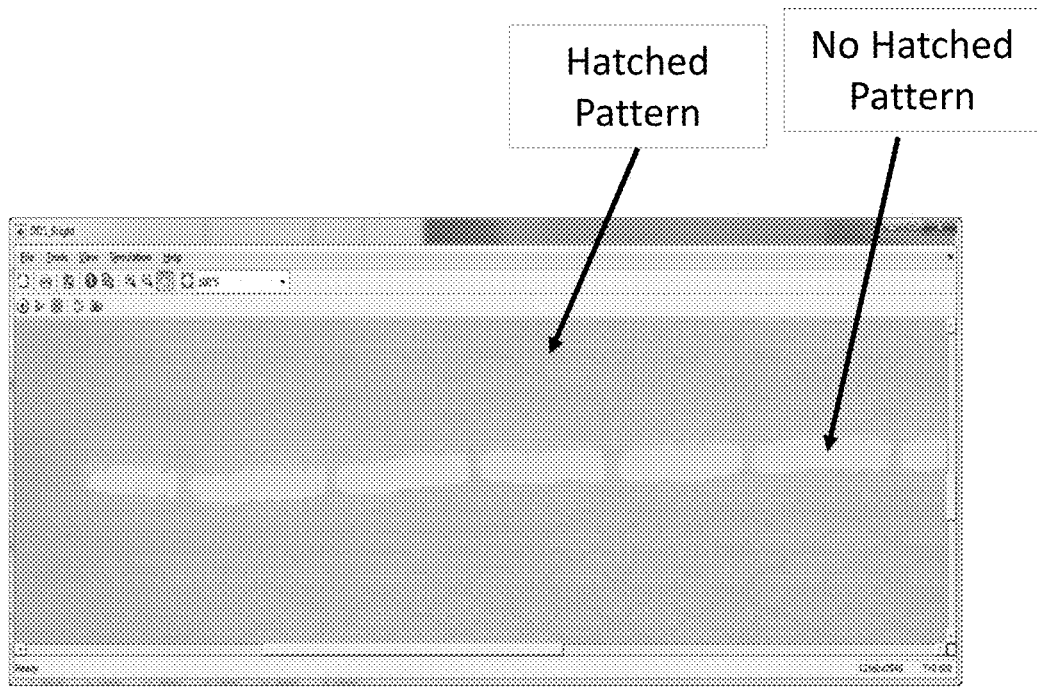
FIG. 2E illustrates a computer image showing a resulting image produced by a conventional CMOS image sensor using a lookup table fader as shown in FIG. 2D.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Figure 3A:
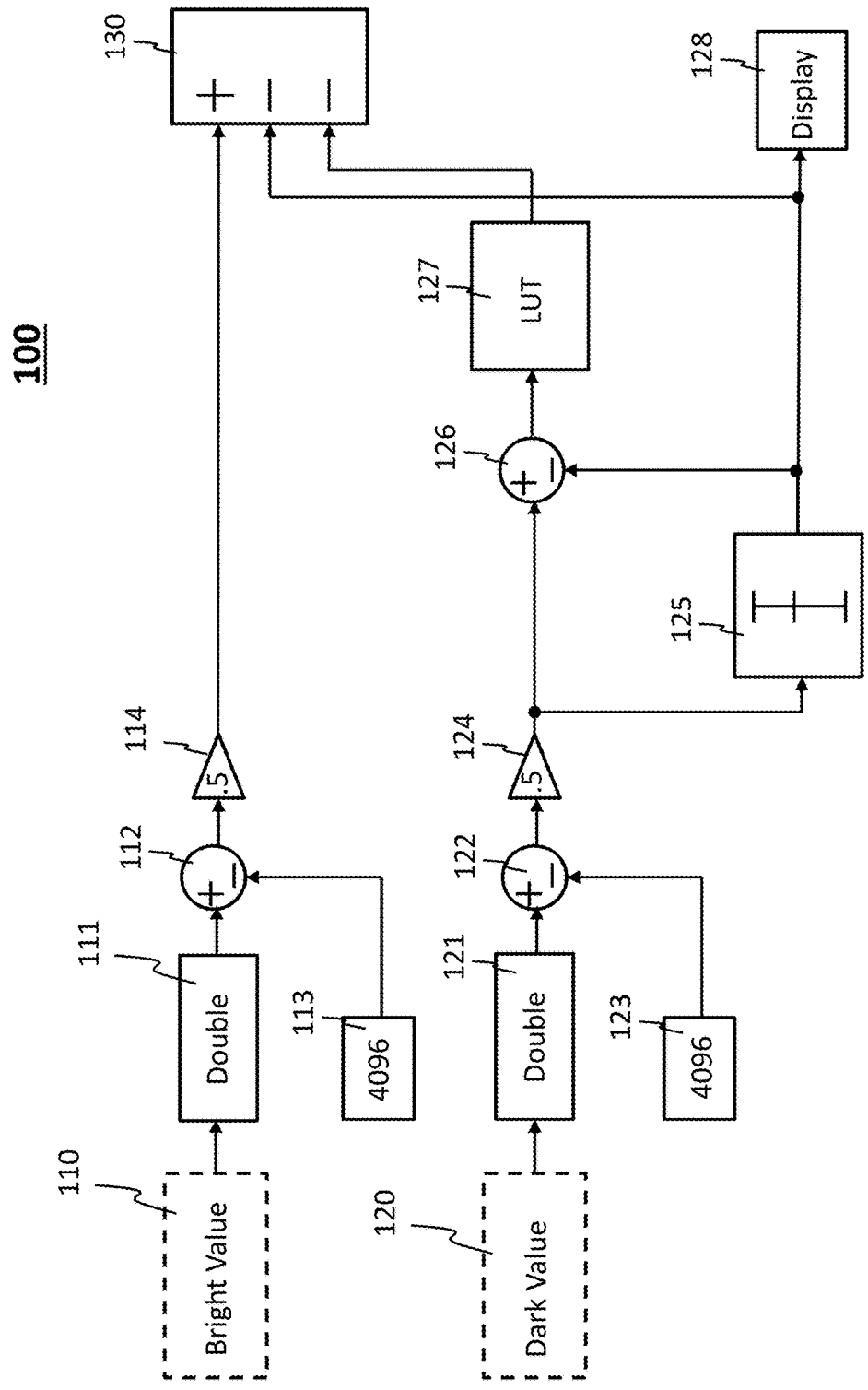
FIG. 3A illustrates a logic diagram of a circuit for performing high dynamic range digital double sampling according to an exemplary embodiment.

FIG. 3A illustrates a logic diagram of a circuit for performing high dynamic range digital double sampling according to an exemplary embodiment. It is should be appreciated that the logic diagram illustrates the digital processing stage of an imaging device after the analog pixel data has been sampled from the pixel array, read out from the comparator array, and converted (i.e., digitized) to digital signals by a plurality of analog to digital converters. As example pixel configuration is shown above in FIG. 1, but the exemplary design can be implemented for DDS techniques available to any variations of pixel designs.

As shown, FIG. 3A illustrates receipt of the sampled and digitized bright value 110 and sampled and digitized dark value 120. As explained above, the dark value 120 is the digital conversion of a first analog signal output by an initialized pixel during the digital double sampling process. Moreover, the bright value 110 is the digital conversion of a second analog signal received from the pixel that has received an external image signal.

In the exemplary embodiment, the signals (i.e., the bright value 110 and dark value 120) are received in 16 bit unsigned containers, while the actual digitized values are signed 14 bit values. Thus, the containers of each of bright value 110 and dark value 120 is respectively processed by data conversion circuits 111 and 121, subtractors 112 and 122, and amplifiers 114 and 124. More particularly, the bright value 110 is converted and a constant value is subtracted from the converted value by a logic circuit 112 before it is amplified in this case by a gain of 0.5 by amplifier 114. Likewise, the dark value 120 is converted and a constant value is subtracted from the converted value a logic circuit 112 before it is amplified also in this case by a gain of 0.5 by amplifier 114. These conversion steps are simply to access the signed 14 bit value from the 16 bit unsigned container and are not critical for explaining the aspects of the disclosed invention. Thus, it should be appreciated that alternative circuitry for these processing components can be implemented as would be understood to one skilled in the art.

In any event, the output of the processed bright value 110 is fed to a digital logic circuit 130, i.e., an adder or summer implemented by digital logic devices. The digital logic circuit 130 is provided to generate an image correction signal by performing the digital double sampling using digital output values received from both a dark value average calculating unit 125 and a lookup table 127. As shown, the digital logic circuit 130 has one non-inverting and two inverting inputs for receiving this respective signals. Any conventional adder logic can be used to implement the digital logic circuit 130 and will not be explained herein in detail.

As shown, the initial sampled dark value 120 that is processed is fed to dark value average calculating unit 125 that may include electronic memory to store the dark values and processing logic to calculate an average initial dark value for the sampled pixel. Alternatively, the functionality of the dark value average calculating unit 125 can be implemented in software. Moreover, in one aspect, this value (e.g., "2163", which is a digital number "DN" representing the sampled illumination level) can be provided on display 128. As further shown, the average dark value is fed to a negative or inverting input of digital logic circuit 130. In other words, this value is the dark signal DC offset that is estimated by dark value average calculating unit 125 and transmitted through the loop to digital logic circuit 130. The digital logic circuit 130 is configured to linearly subtract this value from the bright value 110 to suppress kTC noise and remove all other disturbances, including offsets in the readout chain up to the digital conversion, to effectuate the digital double sampling of the sampled pixel.

Figure 4A:
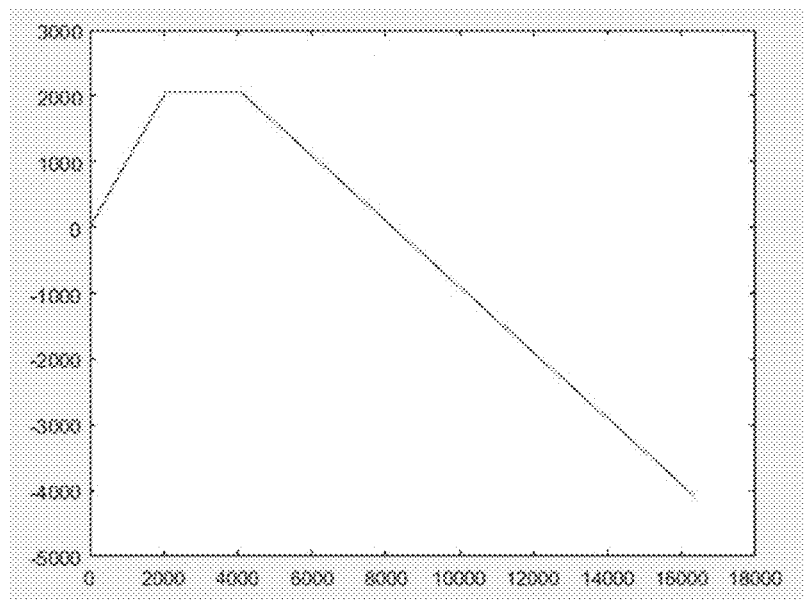
FIGS. 4A and 4B illustrate exemplary lookup tables provided in the logic diagram of the circuit for performing high dynamic range digital double sampling according to an exemplary embodiment.
Figure 4B:
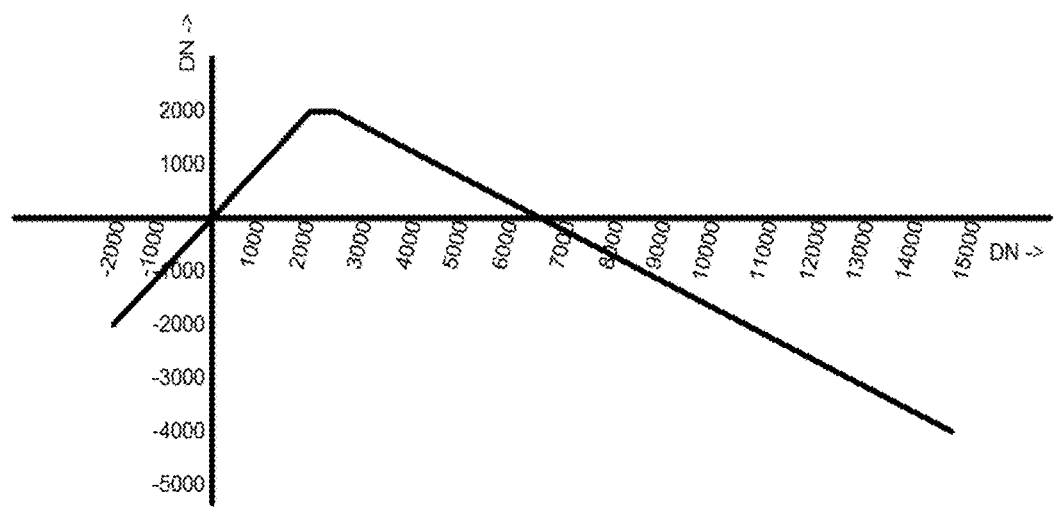

According to the exemplary embodiment, the higher dark values should be handled as positive video data since it is likely that the pixels have been saturated due to high illumination conditions as discussed above. In this regard, higher dark values will first be applied to digital dark value adjuster 126, which can be a digital logic subtractor configured to subtract the mean DC value of the dark signal output from dark value average calculating unit 125 so a sign conversion can be made. The calculated value, i.e., an adjusted dark value is then fed to a lookup table 127. An example of a programmable lookup table 127 according to the exemplary embodiment is shown in FIGS. 4A and 4B. However, in general, the lookup table 127 receives the illumination input (in the x axis of the lookup table) and identifies a corresponding illumination output value (in the y axis of the lookup table) that can be fed to another negative input of digital logic circuit 130. It should be appreciated that the illumination output value can be an optimal artifact correction signal that can remove artifacts from the sampled bright values of the saturated pixel during image capture.

Referring to FIGS. 4A and 4B, the output of the lookup table 127 is shown to first increase linearly with the illumination input, for example, to an approximate measured DN value of the dark value of 2000 or so. In other words, this portion of the lookup table presumes full functionality of the corresponding pixel (i.e., non-overexposed or unsaturated illumination state). The output value is then constant at 2000 until an illumination of approximately 4000 DN. At this stage, the output of the lookup table decreases linearly as the measured illumination input continues to increase. Thus, it is assumed that the pixel has saturated due to illumination conditions of the captured image. Moreover, the output value reaches a negative value at approximately 8000 DN. This is because the negative value needs to be added, by digital logic circuit 130, to the received bright value 110. Moreover, it should be understood that lookup table 127 can be implemented using digital logic circuit configured using common IF THEN logic. For example, the lookup table can be implemented using the follow logic:

DarkX=[0 2048 4096 8192 10240 12288 14336 16383]

DarkLUT_log=[0 2048 2048 0 −1024 −2048 −3072 −4096]

It should be appreciated that the lookup table 127 can be programmable according to a designers preference, device viewer device specifications, and the like. Thus, these exemplary numbers for "DarkX" and DarkLUT_log" can be programmed accordingly, for example.

Referring back to FIG. 3A, the digital logic circuit 130 receives the bright value 110 and subtracts the average dark value output from dark value average calculating unit 125 to remove DC offset of the whole dark picture and produce a DDS output value. As shown, unit 125 can calculate this DC offset through a moving average based on received sampled digitized values, by a mean of all pixels in the "dark" pixel array, or simply be predefined as a setting if the DC offset for the pixel array is known.

In any event, this signal is then further processed by subtracting the output value determined by lookup table 127. If the pixel has been saturated, the output value will be a high negative output value (e.g., −4000 DN), which will then actually be added to the bright value 110 since it is fed on an inverting input of the digital logic circuit 130. As a result, the exemplary circuit is configured to perform a high dynamic range of digital double sampling by addressing saturation issues with pixels in the pixel array.

It should be appreciated that if the pixel is operating in full functionality (no saturation or over exposure), a digitized dark value 120 that is output from subtractor 126 plus dark value average calculating unit 125 will be the same value as that output from amplifier 124. Thus, the mean value is always extracted from logic circuit 130. At subtractor 126, the remaining value will be at or close to 0, with kTC plus offset information about the pixel. Lookup table 127 will then pass the lower values to perform a full DDS operation for the non-overexposed part of the picture. Higher "dark" values input to the lookup table are inverted as shown, which means they are added to the bright value by logic circuit 130. As explained above, these higher dark values are in the areas of a picture with high illumination. Thus, the inventive circuit provides a high dynamic range digital double sampling.

Moreover, in the embodiment in which the dark value average calculating unit 125 is calculating a moving average, even though high dark values (i.e., during pixel saturation) will be fed to the dark value average calculating unit 125, these values will not substantially affect the calculated mean over time by this unit 125 since there will be a significantly high ratio of full functionality dark values compared with high dark values sampled during pixel saturation. In other words, the time the pixel is sampled is sampled during saturation is quite small compared with samples during full functionality.

It should be appreciated that while the pixel value signal processing is shown in FIG. 3A to be performed by a hardware logic circuit, the processing can be performed by processor executing software and/or a combination of hardware and software according to an alternative embodiment.

Figure 3B:
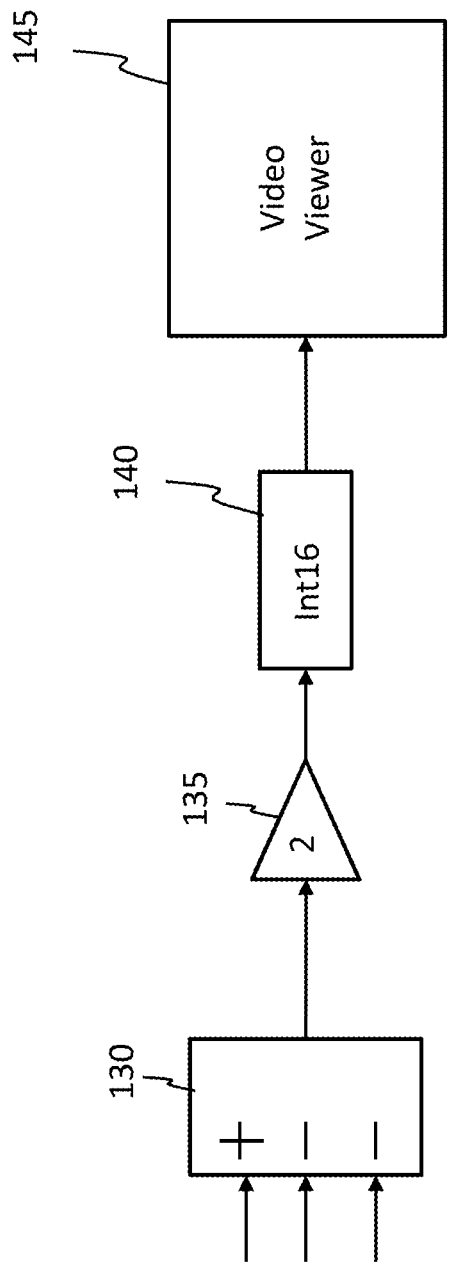
FIG. 3B illustrates a logic diagram of an output stage of the circuit for performing high dynamic range digital double sampling according to an exemplary embodiment.

FIG. 3B illustrates a logic diagram of an output stage of the circuit for performing high dynamic range digital double sampling according to an exemplary embodiment. As shown, the calculated pixel value output digital logic circuit 130 is fed to amplifier 135 which amplifies the signal by a magnitude of 2.0 according to an exemplary embodiment. Moreover, another signal conversion circuit 140 is provided to convert the amplified signal to correct format to be fed for display on video viewer 145.

Figure 5:
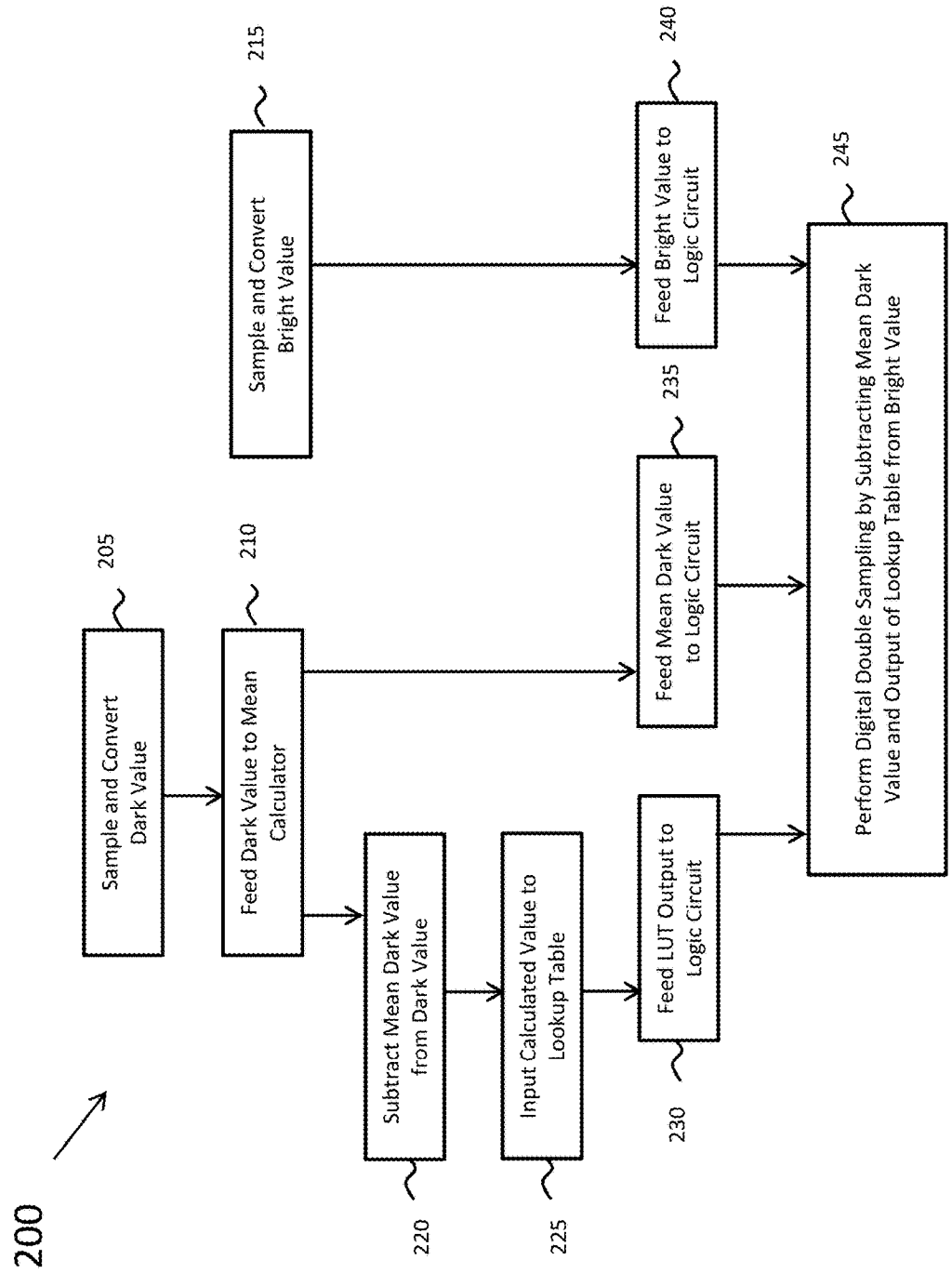
FIG. 5 illustrates a flowchart for a method for performing high dynamic range digital double sampling according to an exemplary embodiment.

FIG. 5 illustrates a flowchart for a method for performing high dynamic range digital double sampling according to an exemplary embodiment. As shown, initially at step 205, the dark value is sampled and readout by a pixel in a pixel array of a CMOS image sensor, for example. After read out and analog-to-digital conversion of the sampled signal, the dark value is fed to a calculating unit (e.g., dark value average calculating unit 125) for calculating an updated average of the dark value. This process continues for numerous sampled values of the pixel according to an exemplary aspect.

In accordance with digital double sampling techniques, a bright value is then sampled and readout by the pixel in the pixel array at step 215. Next, at step 220, digital logic is provided to subtract the mean dark value from the digital dark value. This calculated value is then fed into a lookup table (e.g., lookup table 127) as described above.

At step 230, the lookup table output is then feed to a digital logic circuit, such as digital logic circuit 130. Likewise, the mean dark value is fed to the logic circuit at step 235 and the sampled and digitized bright value is fed to the logic circuit at step 240. It should be appreciated that steps 230-240 can be performed concurrently or in no particular order, for example. Finally, at step 245, the logic circuit performs the digital double sampling calculation by subtracting the mean dark value and the lookup table output from the digitized bright value. Although not shown, this value is then fed to a video viewer for display. It is noted that the additional processing and filtering steps described above are not shown in the flowchart of FIG. 3 so as to not unnecessarily obscure the objects of the invention.

Figure 6:
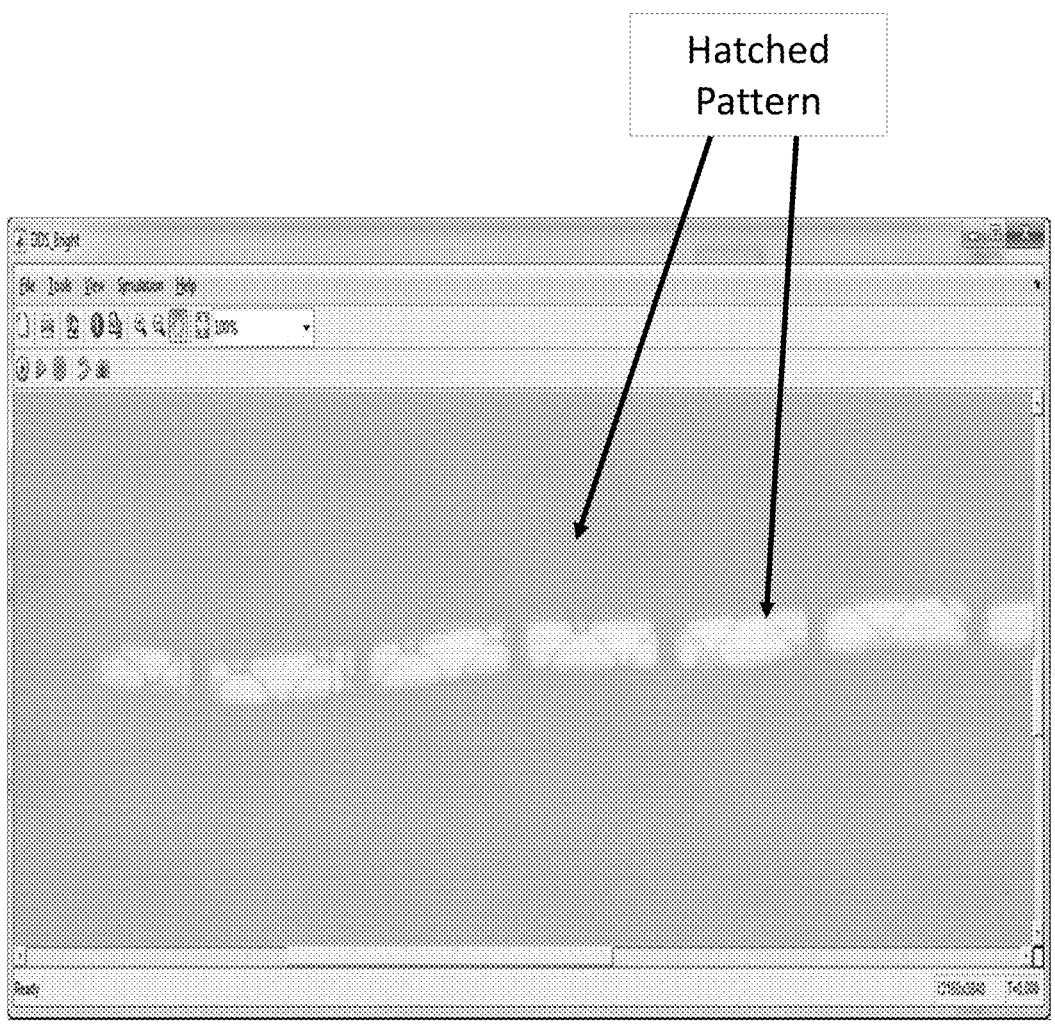
FIG. 6 illustrates a computer image showing a resulting image of a CMOS image sensor implementing the circuit for performing high dynamic range digital double sampling as shown in FIG. 3A.

FIG. 6 illustrates a computer image showing a resulting image of a CMOS image sensor implementing the circuit for performing high dynamic range digital double sampling as shown in FIG. 3A according to an exemplary embodiment. As shown, unlike the conventional techniques discussed above, the exemplary design can generate an image that preserves the details in the highlight.

Figure 7A:
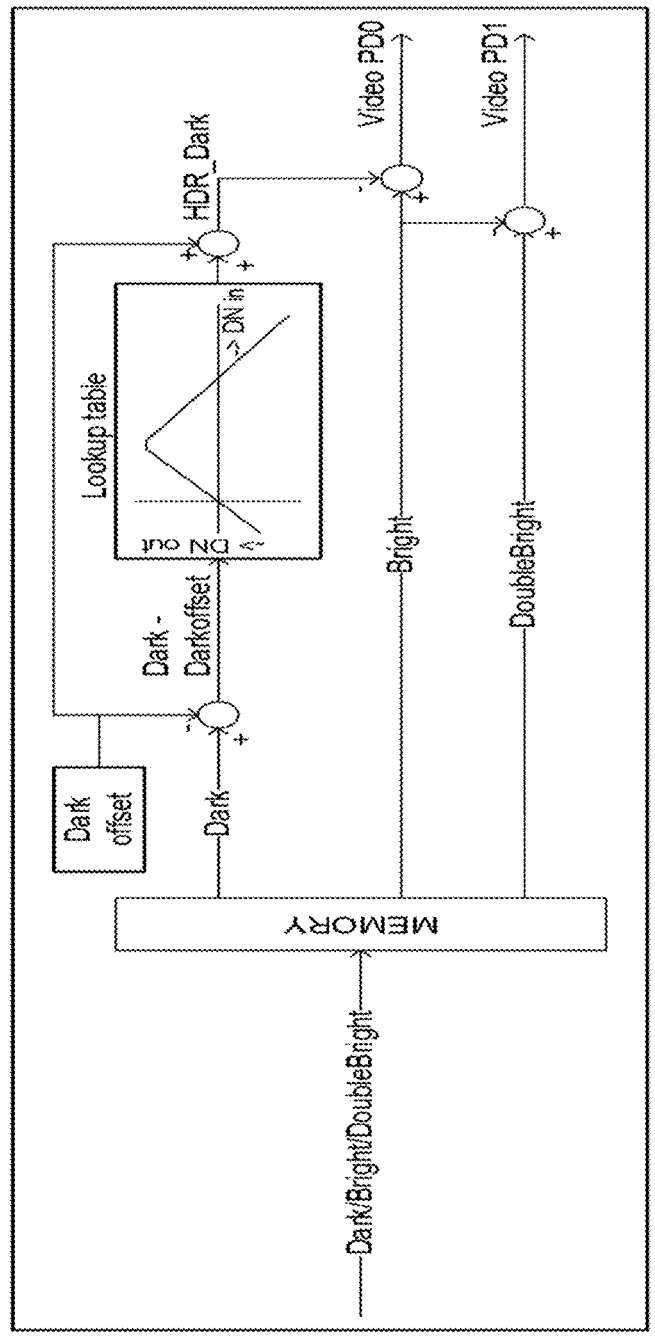
FIG. 7A illustrates a high-level block diagram of a system for performing high dynamic range digital double sampling according to another exemplary embodiment.

FIG. 7A illustrates a high-level block diagram of a system 300A for performing high dynamic range digital double sampling according to another exemplary embodiment. As shown, the system 300A is configured to prevents a "black sun" effect and increase the imager dynamic range by using the "dark value". Advantageously, the floating shared diffusion of the photodiode where the dark value is generated can be seen as an additional photodiode with a very short exposure time.

According to an exemplary aspect, first a dark offset value (i.e., a constant value) can be subtracted from the sampled dark value, which is a dark reference sampled for each pixel before accumulating electrons during image captured. Next, the resulting dark—dark offset signal is converted in a lookup table as described above. As further explained above, at a small signal value, the signal is unchanged, while high values are inverted. After applying the lookup table, the dark offset value is added again to the output of the lookup table, which results in the HDR_Dark signal. With these signals dDDS processing is applied to the bright and double bright values of the sampled photodiode. As a result, the low illumination part of the image is kT/C and offset corrected with full DDS performance. For high illumination, the photo shotnoise is dominant over kT/C. The average black with the inverted video is subtracted, resulting in an addition of the video related dark signal. Advantageously, a high dynamic range picture can be created while preventing a black sun effect while preserving details in a highlight.

Figure 7B:
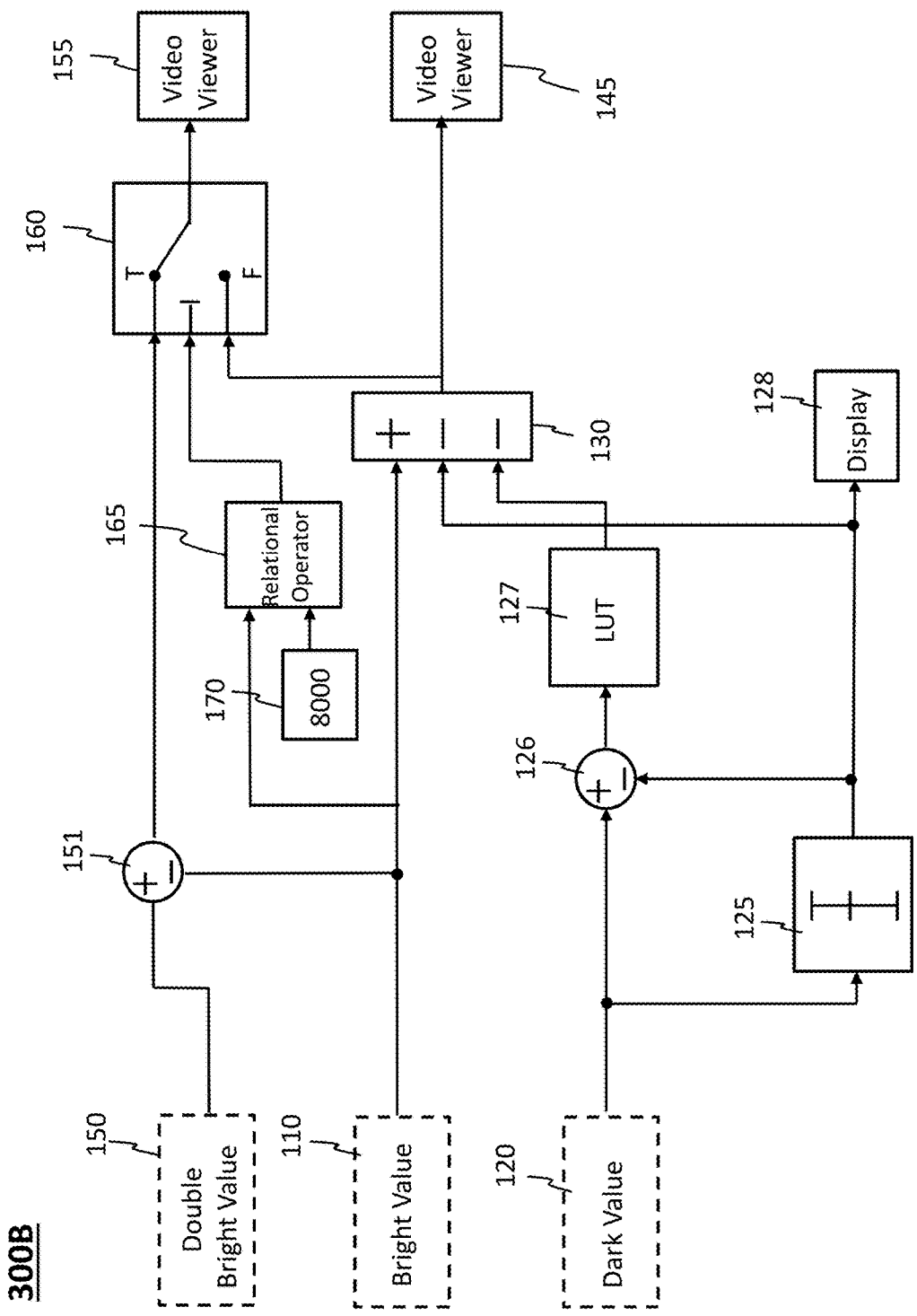
FIG. 7B illustrates a logic diagram of a circuit for the system for performing high dynamic range digital double sampling as shown in FIG. 7A.

FIG. 7B illustrates an exemplary logic diagram of a circuit for the system 300B for performing high dynamic range digital double sampling as shown in FIG. 7A. It is also noted that the data conversion and processing components shown in FIG. 3A and described above are not illustrated in this figure in order to clarify the representation of this embodiment.

As shown in this embodiment, a second sampled and digitized bright value (i.e., a double bright value) 150 may be received from the pixel array and analog circuit of a CMOS circuit. More particularly, it is contemplated that the pixel array can concurrently sample two sub-pixels (i.e., the voltage of two photodiodes) and output a single value. For example, the double bright value 150 can be the digitized bright value 110 plus a digitized value of another sub-pixel in the array. First, this double bright value 150 is applied to subtractor 151 to extract the bright value 110. The subtractor 151 is a digitized output value calculator whose output represents a digitized value of the second sub-pixel that is then fed to switch 160. The switch 160 is a digital logic provided as a bright value selector for selecting the correct bright value based on the saturation level of the one or more pixels of the pixel array. Moreover, a relational operator 165 drives the switch 160 based on a comparison of the bright value 110 and a constant 170, which indicates whether the pixel has been saturated. If the relational operator 165 outputs a true signal (e.g., a digital "1"), the switch 160 is driven to a first state to receive the value output from subtractor 151. This value is then output to video viewer 155. Alternatively, if the relational operator 165 outputs a false signal (e.g., a digital "0"), the switch is driven to a second state to receive the output from logic circuit 130. In this instance, the video viewer 155 displays the resulting signal in a similar manner as described above with respect to FIG. 3A.

It is noted that according to a refinement of the exemplary embodiment, video viewers 145 and 155 are part of the same displayed device are simply shown separately to indicate that the corrected bright value 110 can be displayed on viewer 145 while the corrected double bright value 150 can be displayed on video viewer 155. He video viewers 145 and/or 145 are image generators that are configured to displayed the captured image based on the correction signal selected by switch 160, such that the captured image is displayed without black sun artifacts that would otherwise appear in the image due to the saturated one or more pixels.

Figure 8:
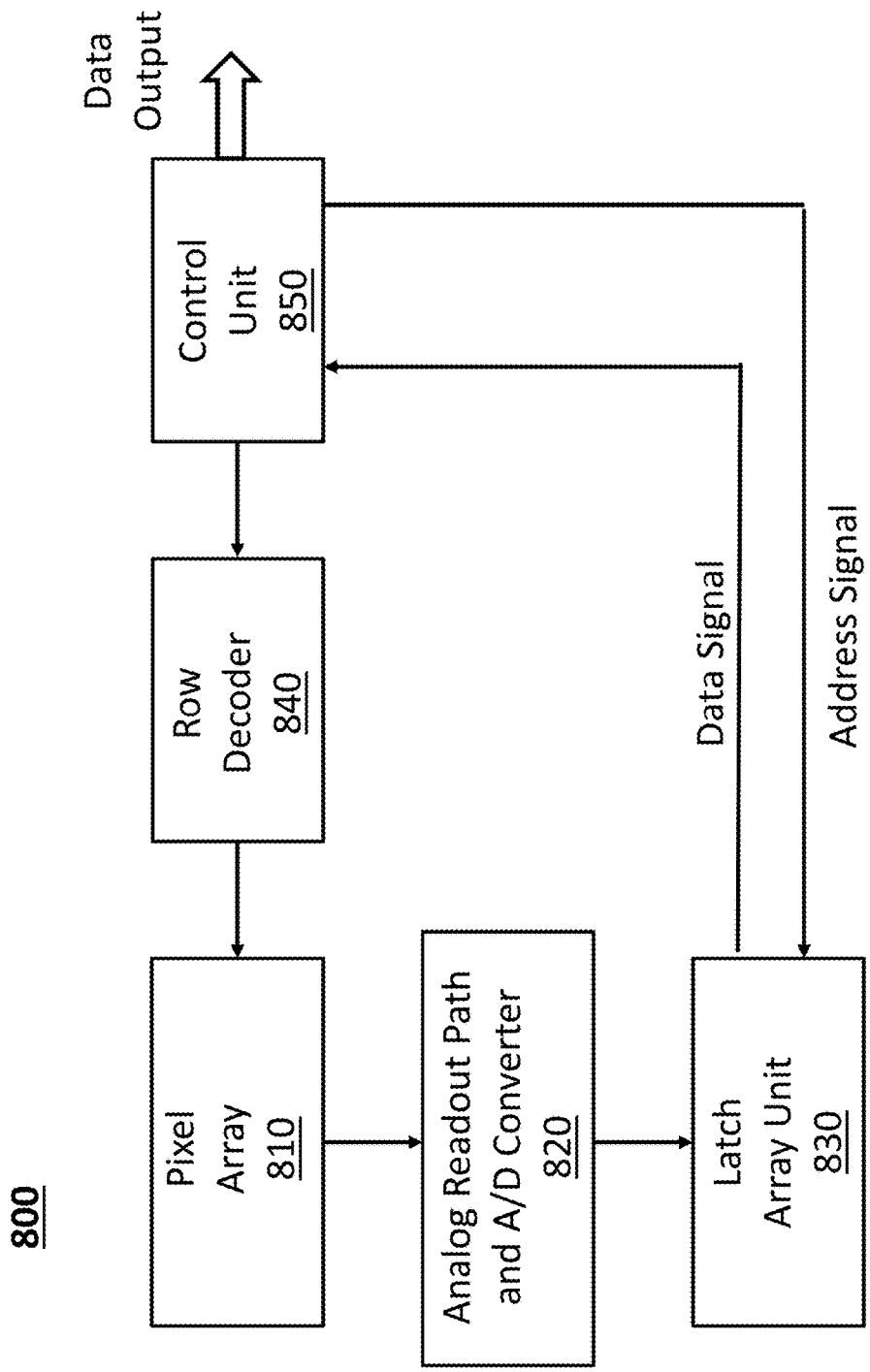
FIG. 8 illustrates a block diagram of a CMOS imaging device for performing high dynamic range digital double sampling according to another exemplary embodiment.

Finally, FIG. 8 illustrates a block diagram of a CMOS imaging device for performing high dynamic range digital double sampling according to another exemplary embodiment. As shown, the CMOS image sensor 800 includes a pixel array 810 including a plurality of pixels, which has an output fed to an analog readout path and A/D converter 820, which is provided for sampling the pixel output values (i.e., the dark, bright and double bright values) and processing the analog output voltages from the pixel array 810 to convert sampled analog pixel output signals into digital signals. The digital signals are then fed to a latch array unit (or line buffer) 830 for storing the digital signals. It should be appreciated that the line buffer 830 can include multiple lines depending on the readout order of the pixels of pixel array 810.

Moreover, a control unit 850 is provided for providing control signals used in controlling the aforementioned units and outputting data to the outside (e.g., a display unit) through an interface. The control unit 850 can includes one or more processors and one or more modules for executed the control algorithms described herein. The modules may be software modules running in the processor, or resident/stored in memory, one or more hardware modules coupled to the processor, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

It should be appreciated that the control unit 850 can include the inventive logic circuit shown in either of FIG. 3A or FIG. 7, as described above, in order to processed received digital signals and output them (i.e., the data output) to a video viewer. In addition, the control unit 850 is coupled to a row decoder 840 that is configured to output the control signals for selecting the rows in the pixel array 810 based on a control signal transmitted from the control unit 850.

Preferably the analog readout path and A/D converter 820 includes comparators as many as the number of columns of the pixel array 810 as described above. Each of the comparators serves a role of converting an analog pixel value of a column in which it is located into a digital signal. The digital signal is stored in the latch array unit 830 including latches as many as the number of the columns of the pixel array 810. The digital signals stored in the latch array unit 830 are subjected to an image processing by the control unit 850 and then, sequentially outputted through output pins of the image sensor in the image processed order.

It should be appreciated that in the examples above, all switching signals are assumed to be positive logic signals, i.e. a high level, or "1" results in closing the switch. It is, however, also possible to use an inverted logic, or to use both, positive and negative, logic in a mixed manner.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. An image processing system for removing black sun artifacts in a captured image resulting from oversaturated pixels of a CMOS image sensor, the image processing system comprising:
   a pixel sampler configured to sample a digital dark value, a digital bright value and a digital double bright value of at least one pixel in a pixel array of a CMOS image sensor during image capture, the digital bright value corresponding to a sampled output of a first sub-pixel of the at least one pixel and the digital double bright value corresponding to a sampled combined output of the first sub-pixel and a second sub-pixel of the at least one pixel;
   a digitized output value calculator configured to calculate a digitized value of the second sub-pixel by subtracting the sampled digital bright value from the sampled digital double bright value;
   a digital dark value adjuster configured to subtract a mean dark value of the at least one pixel from the sampled digital dark value to produce an adjusted dark value;
   a lookup table configured to receive the adjusted dark value and determine a corresponding illumination output value for the digital dark value, wherein the determined illumination output value is configured to remove black sun artifacts in the captured image when displayed on a display device;
   an image correction signal generator configured to generate a digital double sampling (DDS) output value by subtracting the mean dark value and the determined illumination output value from the sampled digital bright value;
   a bright value selector configured to determine the calculated digitized value of the second sub-pixel for a corrected image signal for image generation when a relational operator determines that the second sub-pixel is not saturated, and to determine the generated DDS output value as the corrected image signal for the image generation when the relational operator determines that the second sub-pixel is saturated; and
   an image generator configured to display the captured image on the display device based on the determined corrected image signal, such that the captured image is displayed without black sun artifacts.

2. The image processing system according to claim 1, wherein the digital dark value adjuster is further configured to adjust the mean dark value based on the sampled digital dark value.

3. The image processing system according to claim 1, wherein the lookup table identifies a negative illumination output value for the sampled digital dark value if the at least one pixel is in an overexposed illumination state.

4. The image processing system according to claim 3, wherein the relational operator drives the bright value selector based on a saturation state of the second sub-pixel to a first state to select the calculated digitized value of the second sub-pixel for the corrected image signal or to a second state to select the generated DDS output value for the corrected image signal.

5. The image processing system according to claim 1, wherein the pixel sampler comprises at least one data conversion circuit configured to convert a sampled dark value, a bright value and a double bright value of the at least one pixel in the pixel array to the digital dark value, the digital bright value and the digital double bright value, respectively.

6. An image processing system for removing artifacts from a captured image resulting from oversaturated pixels, the image processing system comprising:
   a pixel sampler configured to sample a digital dark value and a digital bright value of at least one saturated pixel in a pixel array of an image sensor during image capture;
   a digital dark value adjuster configured to subtract a mean dark value of the at least one saturated pixel from the sampled digital dark value to produce an adjusted dark value;
   an artifact corrector configured to determine an artifact correction value by inputting the adjusted dark value into a lookup table that outputs an optimal artifact correction value that is configured to remove at least one artifact from the captured image when displayed on a display device;
   an image correction signal generator configured to generate a corrected digital bright value for the at least one saturated pixel by subtracting the mean dark value and the outputted optimal artifact correction value from the sampled digital bright value; and
   an image generator configured to display a corrected captured image based on the corrected digital bright value that does not display at least one artifact based on the at least one saturated pixel.

7. The image processing system according to claim 6, wherein the pixel sampler is configured to sample a digital double bright value of at least one saturated pixel in the pixel array, the digital bright value corresponding to a sampled output of a first sub-pixel of the at least one saturated pixel and the digital double bright value corresponding to a sampled combined output of the first sub-pixel and a second sub-pixel of the at least one saturated pixel.

8. The image processing system according to claim 7, further comprising a digitized output value calculator configured to calculate a digitized value of the second sub-pixel by subtracting the sampled digital bright value from the sampled digital double bright value.

9. The image processing system according to claim 8, further comprising a bright value selector configured to determine the calculated digitized value of the second sub-pixel for a corrected image signal for image generation when a relational operator determines that the second sub-pixel is not saturated, and to determine the optimal artifact correction value as the corrected image signal for the image generation when the relational operator determines that the second sub-pixel is saturated.

10. The image processing system according to claim 9, wherein the image generator is further configured to display the corrected captured image based on the determined corrected image signal, such that the captured image is displayed without black sun artifacts.

11. The image processing system according to claim 6, wherein the digital dark value adjuster is further configured to adjust the mean dark value based on the sampled digital dark value.

12. The image processing system according to claim 9, wherein the lookup table identifies a negative illumination output value for the sampled digital dark value if the at least one saturated pixel is in an overexposed illumination state.

13. The image processing system according to claim 12, wherein the relational operator drives the bright value selector based on a saturation state of the second sub-pixel to a first state to select the calculated digitized value of the second sub-pixel for the corrected image signal or to a second state to select the optimal artifact correction value for the corrected image signal.

14. The image processing system according to claim 6, wherein the pixel sampler comprises at least one data conversion circuit configured to convert a sampled dark value and sampled a bright value of the at least one saturated pixel in the pixel array to the digital dark value and the digital bright value, respectively.

15. An image processing system for generating an enhanced image without artifacts caused by oversaturated pixels, the image processing system comprising:
    an artifact correction determiner configured to identify at least one artifact correction value based at least on an obtained dark value of at least one pixel of an image sensor;
    a pixel output corrector configured to apply the identified at least one artifact correction value to an obtained bright value of the at least one pixel to generate an enhanced image configured to be displayed without at least one artifact caused by saturation of the at least one pixel;
    a pixel sampler configured to convert the obtained dark value to a digital dark value and to convert the obtained bright value to a digital bright value of the at least one pixel during image capture; and
    a digital dark value adjuster configured to subtract a mean dark value of the at least one pixel from the converted digital dark value to produce an adjusted dark value.

16. The image processing system according to claim 15, wherein the artifact correction determiner is further configured to input the adjusted dark value into a lookup table to determine an optimal artifact correction value that is configured to remove the at least one artifact from the captured image when displayed on a display device.

17. The image processing system according to claim 15, further comprising an image generator configured to display the enhanced image based on the at least one artifact correction value.

18. An image processing system for generating an enhanced image without artifacts caused by oversaturated pixels, the image processing system comprising;
    an artifact correction determiner configured to identify at least one artifact correction value based at least on an obtained dark value of at least one pixel of an image sensor;
    a pixel output corrector configured to apply the identified at least one artifact correction value to an obtained bright value of the at least one pixel to generate an enhanced image configured to be displayed without at least one artifact caused by saturation of the at least one pixel;
    a pixel sampler configured to convert the obtained dark value to a digital dark value and to convert the obtained bright value to a digital bright value of the at least one pixel during image capture,
    wherein the pixel sampler is further configured to obtain a digital double bright value of the at least one pixel, wherein the digital bright value corresponds to an output of first sub-pixel of the at least one pixel sampled during image capture, and wherein the digital double bright value corresponds to a combined output of the first sub-pixel and an output of a second sub-pixel of the at least one pixel sampled during image capture.

19. The image processing system according to claim 18, further comprising a bright value selector configured to determine the digital bright value of the second sub-pixel for a corrected image signal for image generation when a relational operator determines that the second sub-pixel is not saturated, and to determine the identified at least one artifact correction value as the corrected image signal for the image generation when the relational operator determines that the second sub-pixel is saturated.

20. The image processing system according to claim 19, further comprising an image generator configured to display the generated enhanced image based on the determined corrected image signal, such that the generated enhanced image is displayed without black sun artifacts.

21. The image processing system according to claim 15, wherein the digital dark value adjuster is further configured to adjust the mean dark value based on the digital dark value.

22. The image processing system according to claim 16, wherein the lookup table identifies a negative illumination output value as the optimal artifact correction value when the at least one saturated pixel is in an overexposed illumination state.

23. The image processing system according to claim 19, further comprising a digitized output value calculator configured to calculate a digitized value of the second sub-pixel by subtracting the obtained digital bright value from the obtained digital double bright value.

24. The image processing system according to claim 23, wherein the relational operator drives the bright value selector based on a saturation state of the second sub-pixel to a first state to select the calculated digitized value of the second sub-pixel for the corrected image signal or to a second state to select the at least one artifact correction value for the corrected image signal.

* * * * *